(12) United States Patent
Sugimoto

(10) Patent No.: US 6,626,756 B2
(45) Date of Patent: Sep. 30, 2003

(54) AMUSEMENT GAME SYSTEM AND A COMPUTER-READABLE STORAGE MEDIUM

(75) Inventor: Norihide Sugimoto, Nagoya (JP)

(73) Assignee: Konami Corporation, Tokyo (JP)

( * ) Notice: Subject to any disclaimer, the term of this patent is extended or adjusted under 35 U.S.C. 154(b) by 130 days.

(21) Appl. No.: 09/748,361

(22) Filed: Dec. 26, 2000

(65) Prior Publication Data

US 2001/0008840 A1 Jul. 19, 2001

(30) Foreign Application Priority Data

Jan. 14, 2000 (JP) .................................... P2000-010158

(51) Int. Cl.[7] .......................... A63F 13/00; A63F 9/24; G06F 17/00; G06F 19/00
(52) U.S. Cl. .................. 463/4; 463/1; 463/2; 463/3; 463/7; 463/30; 463/37
(58) Field of Search .................. 463/1–8, 30, 37; 273/88, 85, 87

(56) References Cited

U.S. PATENT DOCUMENTS 4,504,055 A * 3/1985 Wells .......................... 463/3
5,435,554 A * 7/1995 Lipson ........................ 463/3

FOREIGN PATENT DOCUMENTS

JP 0 830 881 3/1998
JP 10-80577 3/1998

OTHER PUBLICATIONS

Wagner, Dan. Human Factors Design Guide (Springfield, Virginia, 1996), pp. 8–108 & 8–116.*
Links 386 CD Players Manual, 1st ed. Utah, Access Software, Inc, 1995.*

* cited by examiner

Primary Examiner—Paul T. Sewell
Assistant Examiner—Robert Mendoza
(74) Attorney, Agent, or Firm—Jordan and Hamburg LLP

(57) ABSTRACT

A player inputs the first and second instructions utilizing an input device, to move an object toward a target in a virtual field. A power for moving the object is displayed by a graph and a cursor within a range not exceeding the maximum power value. The cursor moves according to lapsed time after the first instruction detection, to make an optical transmission of change in power to the player. When the second instruction is given, the power is determined based on lapsed time from the first instruction detection to the second instruction detection. The object moves based on the determined movement power in the virtual field. When the player inputs change instruction in the maximum movement power value with the use of the input device, the above-mentioned maximum movement power value is changed and the movement power for moving the object is determined within the range, which does not exceed the maximum movement power value as changed. The player can change the maximum movement power value in accordance with a scene and a condition in the amusement game, permitting an accurate movement of the object to the target position.

12 Claims, 9 Drawing Sheets

POWER GAUGE FOR
NORMAL SHOT
MODE

POWER GAUGE
FOR HALF SHOT
MODE

AMUSEMENT GAME SYSTEM AND A COMPUTER-READABLE STORAGE MEDIUM

BACKGROUND OF THE INVENTION

1. Field of the Invention

The present invention relates to a kind of amusement game system such as a golf amusement game or the like, which can move an object in a virtual field.

2. Description of the Related Art

There is known as such a kind of amusement game, for example, a golf amusement game by which a player can have a virtual reality experience in playing golf utilizing a computer. According to the conventional golf amusement game, a player selects a golf club by preference and hits a ball with it (such hit will also be hereinafter referred to as "shot") on a virtual golf course so as to cause a golf play to progress in a virtual reality manner.

A player can control power, timing and the like for hitting a virtual ball by manipulating a controller or the like, which is attached to an amusement game system, when making a shot. With respect to the most typical procedure for making a shot, the power of shot is expressed by a gauge displayed on a game screen. For example, the game screen has the gauge displayed thereon, which indicates the power of from 0% to 100%, so that a cursor in the gauge can move from the position of 0% to 100% in response to a starting operation for the shot by the player. The player pushes a push button switch of the controller when the cursor reaches a prescribed position. The amusement game system-side computer determines a driving distance of the virtual ball in accordance with the power of the shot, which corresponds to a position to which the cursor comes when the player pushes the push button switch of the controller, so as to move the ball on the virtual golf course. More specifically, the driving distance of the virtual ball is in proportion to a lapse of time from the shot start operation by the player to the push operation of the push button switch.

According to such a conventional golf amusement game, when the player wishes to hit a virtual ball for a shot, it is necessary for him to push the push button switch of the controller when the cursor reaches a position of 20% in the power gauge after completion of a shot start operation.

There is however a limit in pushing the push button switch of the controller when the cursor just reaches the position of 20% in the gauge indicating the power of from 0% to 100%. In addition, the power of the shot is in proportion to a lapse of time. As a result, it becomes more difficult to push the push button switch of the controller when the cursor just reaches a target position, according as the power of the shot becomes smaller.

SUMMARY OF THE INVENTION

An object of the present invention, which has been made in view of the above-described matters, is to provide an amusement game system, in which a device for moving accurately an object toward a target position is given to a kind of amusement game system for moving the object toward a target position in a virtual field.

In order to attain the aforementioned object, an amusement game system of the present invention comprises:

a display device for a picture;

an input device for outputting signals according to operation by a player; and a control device for causing an amusement game to progress and displaying the picture according to a progress of the amusement game on a screen of said display device, said amusement game including a step for moving an object toward a target in a virtual field while making reference to output from said input device, wherein:

said control device comprises:

a first-instruction detection device for detecting first instruction, which has been input by the player with a use of said input device;

a cursor-movement device for moving a cursor on a graph having a prescribed length when said first instruction is detected, said graph being displayed on said display device and indicating a movement power value of said object;

a second-instruction detection device for detecting second instruction, which has been input by the player with the use of said input device;

a movement power value determination device for determining, when said second instruction is detected, the movement power value of said object on a basis of a lapse of time from the point of time when said first instruction has been detected to a point of time when said second instruction has been detected;

an object movement device for moving said object in the virtual field in accordance with the movement power value thus determined; and a change instruction detection device for detecting change instruction in a maximum movement power value, which has been input by the player with the use of said input device;

said movement power value determination device determining the movement power value within a range up to a predetermined maximum movement power value, and said movement power value determination device changing said predetermined maximum movement power value and determining the movement power value within the range up to the maximum movement power value thus changed, when said change instruction detection device detects the change instruction in the maximum movement power value.

According to the amusement game system of the present invention having the above-described structural elements, a player inputs the first and second instructions with the use of the input device in order to move the object toward the target in the virtual field. The movement power value for moving the object is displayed in the form of combination of the graph with the cursor within a range, which does not exceed the maximum movement power value. The cursor moves in accordance with the lapse of time after detection of the first instruction so as to make an optical transmission of change in movement power value to the player. When the second instruction is given, the movement power value is determined on the basis of the lapse of time between the point of time when the first instruction has been detected and the point of time when the second instruction has been detected. When the player inputs change instruction in maximum movement power value with the use of the input device, the maximum movement power value is changed and the movement power value for moving the object is determined within a range, which does not exceeds the maximum movement power value as changed. It is therefore possible for the player to change the maximum movement power value in accordance with a scene and a condition in the amusement game, thus permitting an accurate movement of the object to the target position.

An amusement game system of the present invention comprises:

a display device for a picture;

an input device for outputting signals according to operation by a player; and a control device for causing an amusement game to progress and displaying the picture according to a progress of the amusement game on a screen of said display device, said amusement game including a step for moving an object toward a target in a virtual field while making reference to output from said input device, wherein:

said control device comprises:

a first-instruction detection device for detecting first instruction, which has been input by the player with a use of said input device;

a movement power value display device for displaying movement power value of said object within a range up to a predetermined maximum movement power value by means of a graph having a prescribed length and a cursor movable on said graph;

a first cursor-movement device for moving said cursor on said graph in a direction indicating said maximum movement power value in accordance with a lapse of time from a point of time when said first instruction has been detected;

a second-instruction detection device for detecting second instruction, which has been input by the player with the use of said input device;

a movement power value determination device for determining the movement power value of said object on a basis of a lapse of time from the point of time when said first instruction has been detected to a point of time when said second instruction has been detected;

a second cursor-movement device for moving said cursor toward a standard position on said graph, after detection of said second instruction;

a third-instruction detection device for detecting third instruction, which has been input by the player with the use of said input device;

a movement direction factor determination device for determining a factor associated with a movement direction of said object, in accordance with timing at which said cursor reaches said standard position and with timing at which said third instruction is input;

a movement device for moving said object in the virtual field in accordance with said movement power value as determined and said factor associated with the movement direction of said object a change instruction detection device for detecting change instruction in a maximum movement power value, which has been input by the player with the use of said input device; and a maximum movement power value change device for changing said predetermined maximum movement power value when the change instruction in the maximum movement power value is detected.

According to the amusement game system of the present invention having the above-described structural elements, a player inputs the first, second and third instructions with the use of the input device in order to move the object toward the target in the virtual field. The movement power value for moving the object is displayed in the form of combination of the graph with the cursor within a range, which does not exceed the maximum movement power value. The cursor moves in accordance with the lapse of time after detection of the first instruction so as to make an optical transmission of change in movement power value to the player. When the second instruction is given, the movement power value is determined on the basis of the lapse of time between the point of time when the first instruction has been detected and the point of time when the second instruction has been detected. The cursor then moves toward the standard position on the graph. The player inputs the third instruction when he perceives that the cursor reaches the standard position. The factor associated with the movement direction of the object is determined in accordance with the timing at which the cursor actually reaches the standard position and the timing at which the third instruction by the player is given. The object moves in the virtual field in accordance with the movement power value as determined and the determined factor associated with the movement direction of the object. When the player inputs the change instruction in maximum movement power value with the use of the input device, the maximum movement power value is changed so that the movement power value for moving the object is determined within the range, which does not exceed the maximum movement power value as changed. It is therefore possible for the player to change the maximum-movement power value in accordance with a scene and a condition in the amusement game, thus permitting an accurate movement of the object to the target position.

The above-mentioned maximum movement power value as changed may be smaller than the predetermined maximum movement power value. According to this feature, it is possible for the player to decrease the maximum movement power value in accordance with a scene and a condition in the amusement game, thus permitting an accurate movement of the object to the target position.

The above-mentioned maximum movement power value as changed may be identical to half of the predetermined maximum movement power value. According to this feature, it is possible for the player to halve the maximum movement power value in accordance with a scene and a condition in the amusement game, thus permitting an accurate movement of the object to the target position.

There may be adopted a structure in which the graph indicates the movement power value within a range of from 0% to 100%, and the predetermined maximum movement power value corresponds to the movement power value of 100%; and after detection of the change instruction in the maximum movement power value, the graph indicates the movement power value within a range of from 0% to 50%, and the predetermined maximum movement power value as changed corresponds to the movement power value of 50%. According to this feature, it is possible to grasp the movement power value in a ratio even when different kinds of procedures are taken to move the object, thus leading to easy adjustment and determination of the movement power value by the player.

The position of the graph, which indicates the movement power value of 100%, may also indicate the movement power value of 50% after detection of the change instruction in the maximum movement power value. According to this feature, resolution of the graph after changing the maximum movement power value becomes higher than that of the graph before changing it. As a result, it is possible to improve accuracy in a point at which the player inputs the instruction, relative to the target point, thus permitting an accurate movement of the object to the target position.

The movement velocity of the cursor moving on the graph after detection of the change instruction in the maximum movement power value may be identical to the movement velocity of the cursor moving on the graph before detection of the change instruction in the maximum movement power value. According to this feature, the movement velocity of the cursor (i.e., the movement distance of the cursor/time) before change in the maximum movement power value is identical to the movement velocity thereof after change in it, with the result that the movement time of the cursor relative to a unit value of power (%), after change in the maximum movement power value, becomes longer than that before change in it, thus making it possible for the player to input the instruction in a sufficient period of time. It is therefore possible to improve accuracy in a point at which the player inputs the instruction, relative to the target point, thus permitting an accurate movement of the object to the target position.

The above-mentioned amusement game may be an amusement golf game including a step for moving a ball toward the target in the virtual field. According to this feature, it is possible to move a ball to a target position in an accurate manner.

A computer-readable storage medium of the present invention comprises a program stored therein, said program causing an amusement game to progress and displaying a picture according to a progress of the amusement game on a screen of a display device, said amusement game including a step for moving an object toward a target in a virtual field while making reference to output from an input device of an amusement game apparatus,
wherein:
  said program causes a computer provided in said amusement game apparatus to function respectively as:
    a first-instruction detection device for detecting first instruction, which has been input by the player with a use of said input device;
    a cursor-movement device for moving a cursor on a graph having a prescribed length when said first instruction is detected, said graph being displayed on said display device and indicating a movement power value of said object;
    a second-instruction detection device for detecting second instruction, which has been input by the player with the use of said input device;
    a movement power value determination device for determining, when said second instruction is detected, the movement power value of said object on a basis of a lapse of time from the point of time when said first instruction has been detected to a point of time when said second instruction has been detected;
    an object movement device for moving said object in the virtual field in accordance with the movement power value thus determined; and
    a change instruction detection device for detecting change instruction in a maximum movement power value, which has been input by the player with the use of said input device;
    said movement power value determination device determining the movement power value within a range up to a predetermined maximum movement power value, and said movement power value determination device changing said predetermined maximum movement power value and determining the movement power value within the range up to the maximum movement power value thus changed, when said change instruction detection device detects the change instruction in the maximum movement power value.

According to the storage medium of the present invention, it is possible to cause the computer to function as the control device in the amusement game system of the present invention by reading the program by means of the computer so as to make execution of the program. The storage media may include magnetic storage medium, optical storage medium, photo-electro-magnetic storage medium, semiconductor storage element and other storage device.

A computer-readable storage medium of the present invention comprises a program stored therein, said program causing an amusement game to progress and displaying a picture according to a progress of the amusement game on a screen of a display device, said amusement game including a step for moving an object toward a target in a virtual field while making reference to output from an input device of an amusement game apparatus,
wherein:
  said program causes a computer provided in said amusement game apparatus to function respectively as:
    a first-instruction detection device for detecting first instruction, which has been input by the player with a use of said input device;
    a movement power value display device for displaying movement power value of said object within a range up to a predetermined maximum movement power value by means of a graph and a cursor movable on said graph;
    a first cursor-movement device for moving said cursor on said graph in a direction indicating said maximum movement power value in accordance with a lapse of time from a point of time when said first instruction has been detected;
    a second-instruction detection device for detecting second instruction, which has been input by the player with the use of said input device;
    a movement power determination device for determining the movement power value of said object on a basis of a lapse of time from the point of time when said first instruction has been detected to a point of time when said second instruction has been detected;
    a second cursor-movement device for moving said cursor toward a standard position on said graph, after detection of said second instruction;
    a third-instruction detection device for detecting third instruction, which has been input by the player with the use of said input device;
    a movement direction factor determination device for determining a factor associated with a movement direction of said object, in accordance with timing at which said cursor reaches said standard position and with timing at which said third instruction is input,
    a movement device for moving said object in said virtual field in accordance with said movement power value as determined and said factor associated with the movement direction of said object;
    a change instruction detection device for detecting change instruction in a maximum movement power value, which has been input by the player with the use of said input device; and
    a maximum power value change device for changing said predetermined maximum movement power value, when change instruction in the maximum movement power value has detected.

According to the storage medium of the present invention, it is possible to cause the computer to function as the control device in the amusement game system of the present invention by reading the program by means of the computer so as to make execution of the program. The storage media may include magnetic storage medium, optical storage medium, photo-electro-magnetic storage medium, semiconductor storage element and other storage device.

DETAILED DESCRIPTION OF THE PREFERRED EMBODIMENTS

Now, preferred embodiments of the present invention will be described with reference to the accompanying drawings.

Figure 1:
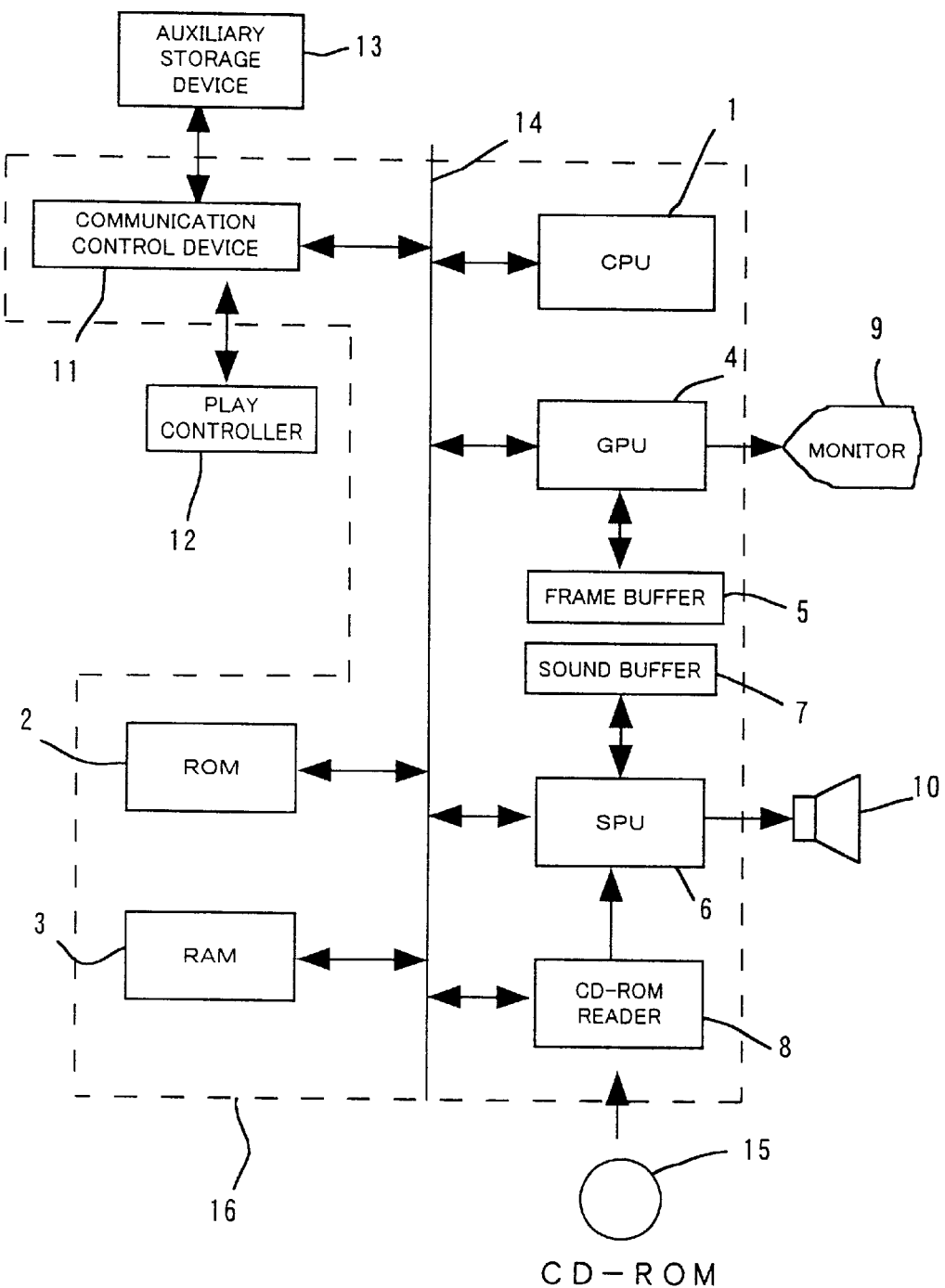
FIG. 1 is a block diagram of a control system of a golf amusement game system to which the present invention is applied.

FIG. 1 is a block diagram of a control system of a home golf amusement game system to which the present invention is applied. The home game system executes a predetermined game in accordance with game programs stored in a CD-ROM 15 functioning as a memory medium.

The game system includes a CPU 1 mainly configured by a microprocessor, a ROM 2 and a RAM 3 serving as main memory devices for the CPU 1, a graphics processing unit (GPU) 104 and a sound processing unit (SPU) 6 for executing processing needed to output visual images and sound, buffers 5 and 7 for the above units 4 and 6, and a CD-ROM reader 8. The ROM 2 stores operating system, which functions as necessary program for the overall control of the game device. Game programs and data read out from the CD-ROM 15 are written into the RAM 3, if necessary. The GPU 4 receives picture data from the CPU 1 and writes them into the frame buffer 5, converts the picture data to prescribed video reproduction signals and outputs them to the monitor 9 at appropriate timings. The SPU 6 reproduces voice and music data as well as music-source data, which are read out from the CD-ROM 15 and then stored in the sound buffer 7, so that corresponding sound is outputted by the speaker 10. The CD-ROM reader 8 reads out necessary programs and data, which are stored in the CD-ROM 15 according to the instruction by the CPU 1, and outputs signals corresponding to the programs and data thus read out. The CD-ROM 15 stores programs and data necessary for the execution of the game. These programs and data will be described later in detail. Generally, a television receiver for home use is used as the monitor 9, and a loudspeaker provided in the television receiver is used as the loudspeaker 10.

Moreover, a communication control device 11 is connected via a bus 14 to the CPU 1, and a play controller 12 and an auxiliary storage device 13 are detachably connected to the communication control device 11. The play controller 12 functions as an input device manipulated by a user who plays the game. The play controller 12 includes operation members, which are to be manipulated by the user. The communication control device 11 scans the state of the operation members of the play controller 12 at a fixed cycle (e.g. 1/60 second), and outputs signals in correspondence with the scanning result to the CPU 1. Based on these signals, the CPU 1 judges the state of the play controller 12. A plurality of controllers 12 and auxiliary storage units 13 may be connected to the communication control device 11 in parallel, at the same time.

With the above-described configuration, the components other than the monitor 9, the speaker 10, the play controller 12, the CD-ROM 15 and the auxiliary storage unit 13 are all accommodated in a single housing to constitute the home game device 16.

Controllers of various designs may be used as the controller 12. For example, a general type controller 12A shown in FIG. 2 may be used.

Figure 2:
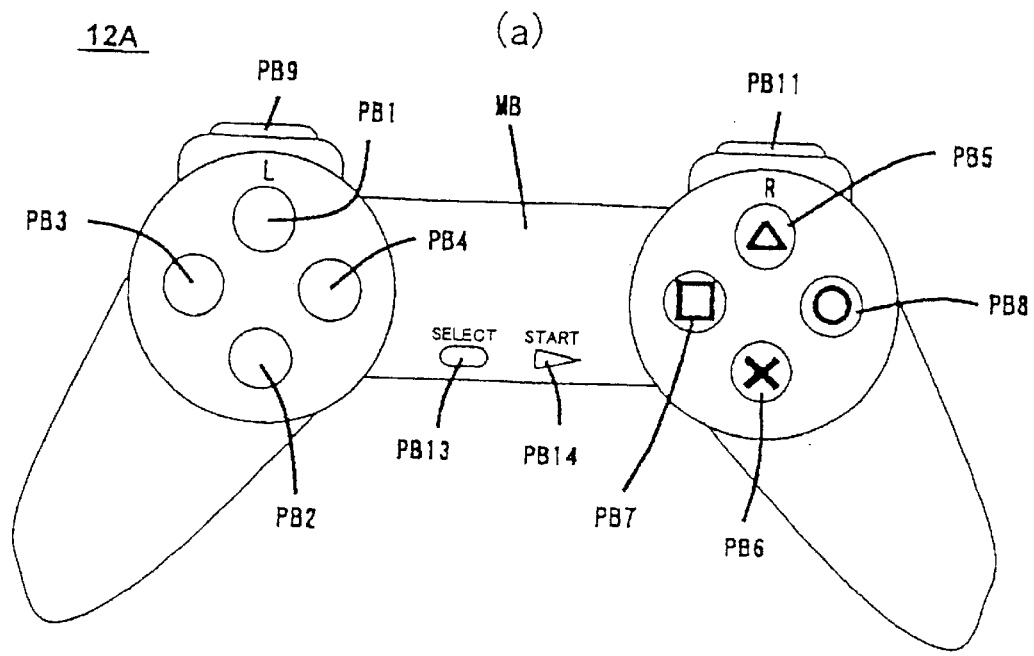
FIG. 2 is a schematic descriptive view illustrating a controller, which can be used in the golf amusement game system as shown in FIG. 1.
Figure 2:
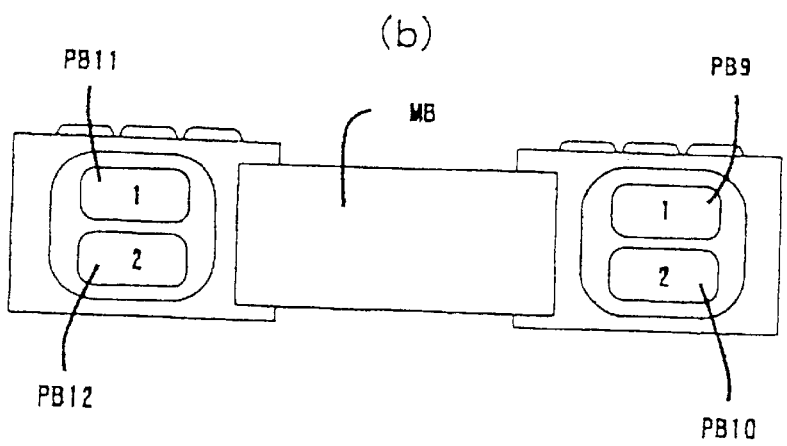

The general type controller 12A as shown in FIG. 2 may generally be used irrespective of the type of the game that the user plays. The controller 12A includes a main body MB, which is formed of synthetic resin, four push switches PB1 to PB4 and four push switches PB5 to PB8 respectively locating on the opposite sides of the main face of the main body MB, two push switches PB9 and PB10 and two push switches PB11 and PB12 respectively locating on the opposite sides of the front face of the main body MB, and small push switches PB13 and PB14 locating in the middle of the main face of the main body MB. The push switches PB1 to PB4 locating on the left-hand side are manipulated to designate the movement directions of a game character or cursor upward, downward, leftward, and rightward, respectively. These switches PB1 to PB8 may also be called as direction designation switches. Various command for playing game are assigned to the switches PB5 to PB8 locating on the right-hand side, and appropriate signs are provided on or around the push switches PB5 to PB8 so that they can be visually distinguished. In the example shown here, symbols "Δ", "X", "□", "○" are indicated on the push switches PB5 to PB8 respectively. Numeral "1" is indicated on each of the push switches PB9 and PB11 locating on the front side, numeral "2" is indicated on each of the push switches PB10 and PB12, a letter "L" is indicated above the push switch PB1, and a letter "R" is indicated above the push switch PB5. The switch PB9 is called as "L1 button", the switch PB10 is called as "L2 button", the switch PB11 is called as "R1 button", and the switch PB12 is called as "R2 button". The push switch PB13 is called as "select button", and the push switch PB14 is called as "start button".

Figure 3:
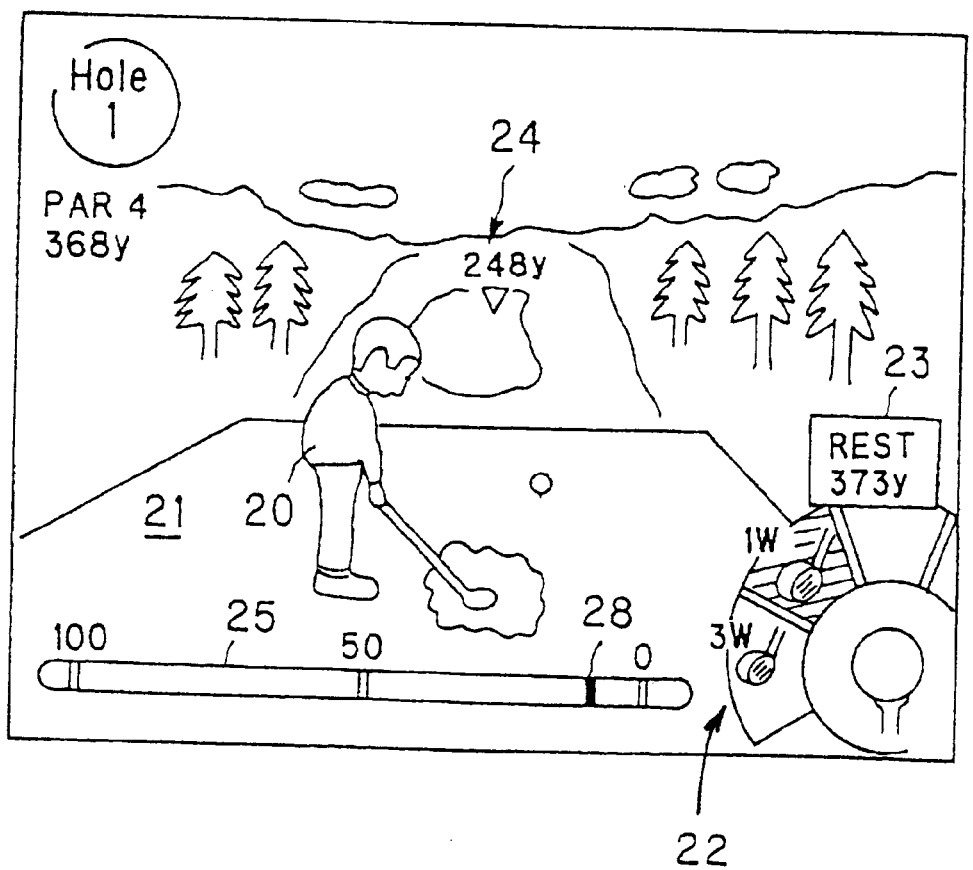
FIG. 3 is a view illustrating an example of a displayed picture when making a normal shot in accordance with the golf amusement game system as shown in FIG. 1.

FIG. 3 illustrates an example of a displayed picture in a shot scene in accordance with the golf amusement game system to which the present invention is applied.

The shot scene as shown in FIG. 3 is so-called a "tee shot" scene. In FIG. 3, a golfer 20 is displayed in the middle on a teeing ground 21 and a golf course spreads ahead of the golfer 20. A target point indication 24 is shown in the almost middle of the course. The target point indication 24 shows a position that a ball may reach provided that a shot is made with idealistic power and timing with the use of a golf club as currently selected.

The scene as shown in FIG. 3 has on its upper and left-hand side indicative information displayed, which includes the number of a golf course hole, the score standard therefor, the distance thereof and the like. The scene also has on its lower and right-hand side a selected-club indication portion 22 in which a driver (1W) as currently selected is highlighted by hatching. A box 23 locating above the selected-club indication portion 22 shows a distance from the golfer to a pin of the hole.

Figure 4:
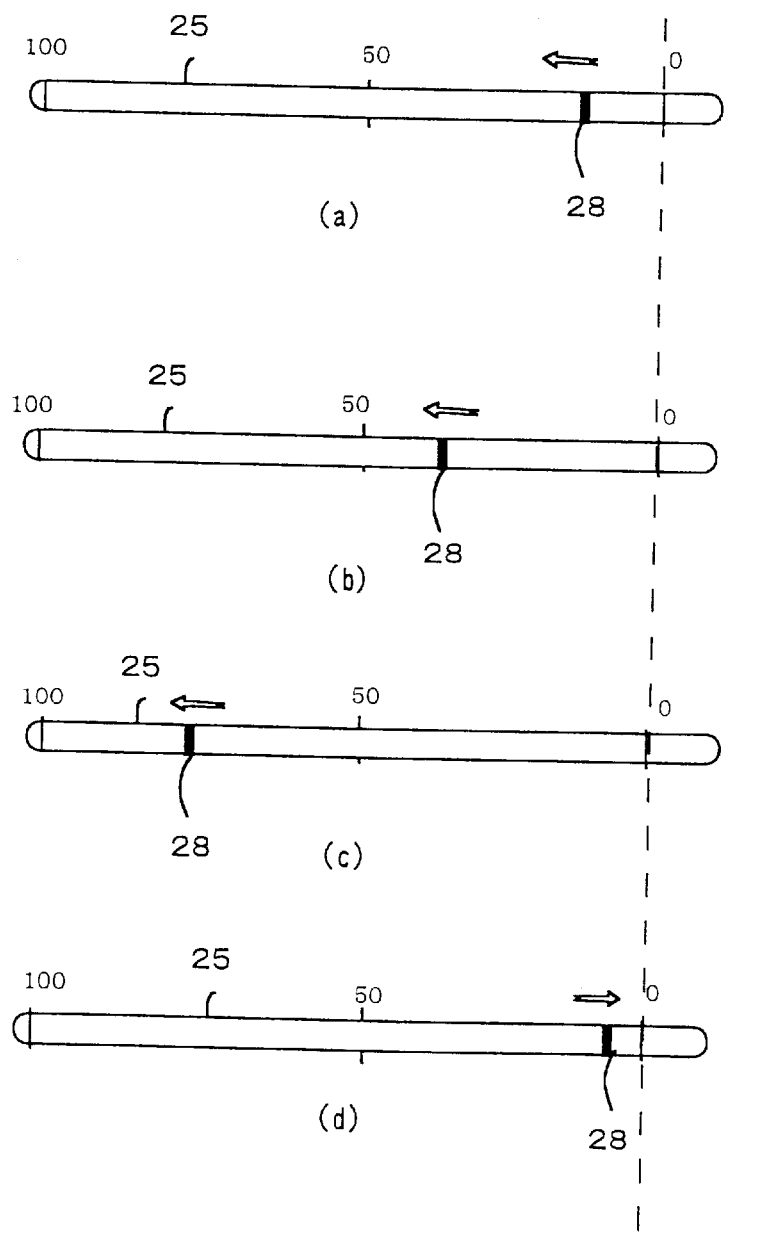
FIG. 4 is a view illustrating displayed examples of a power gauge when making the normal shot.
Figure 5:
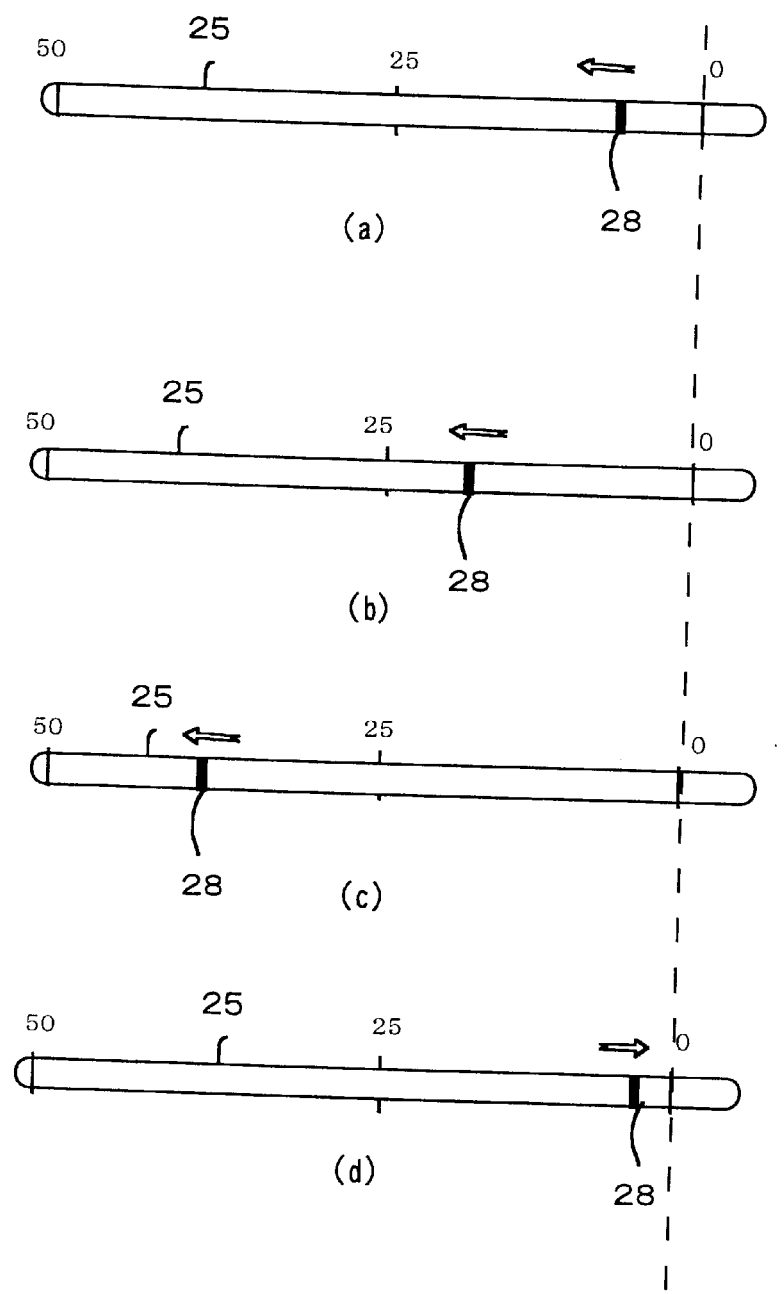
FIG. 5 is a view illustrating displayed examples of the power gauge when making a half shot.

A power gauge 25, which can indicate a power value of shot in the form of a bar graph, locates below the golfer 20. The distance (i.e., the driving distance) by which a ball moves in the virtual field, becomes larger in proportion to the power value of the shot. FIG. 4 is an enlarged view of the power gauge 25. The power gauge serves as a gauge used for the purpose of determining power (hereinafter referred to as the "movement power value") and timing of a shot when making the shot. The player makes a shot by operating the push button of the controller, while watching the power gauge 25. FIG. 4 shows the power gauge when making a normal shot and FIG. 5 shows the power gauge when making a power shot. The normal shot means a shot mode in which the shot is made to obtain a driving distance within standard ranges that are previously set in accordance with the respective golf clubs. On the contrary, the half shot, which is a significant feature of the present invention, means a shot mode provided as a device for forcibly making a shot with a half power of the power for the normal shot.

First, description will be given below of the power gauge when making the normal shot, with reference to FIG. 4. The power gauge 25 can indicate the movement power value within the range of from 0% to 100% when making the normal shot. The driving distance of a ball has previously been determined for the respective kind of gold clubs (i.e., a driver, a 3-iron club or the like, which will hereinafter be referred to as the "club number") in accordance with the game system. Accordingly, in case where the maximum driving distance for the driver is determined to be 250 yards, a shot with the movement power value of 100% leads to the driving distance of 250 yards, but a shot with the movement power value of 50% leads to the driving distance of 125 yards.

The player has to push the push button switch PB8 of the controller as shown for example in FIG. 2(a), totally three times in order to make a shot. The first push operation corresponds to a starting operation of the shot, the second push operation corresponds to a power determination operation and the third push operation corresponds to a shot-timing determination operation. More specifically, the first push operation causes the cursor 28 to start moving in the leftward direction from the position of 0% at a constant velocity. The player watches the position of the cursor on the power gauge 25 and carries out the second push operation when the cursor reaches his desired position. In case where the player wishes to make a shot with the power of 80% for example, the second push operation is carried out when the cursor 28 reaches nearly the position of 80% on the power gauge 25. The movement power value of the shot is determined in this manner.

After the completion of the second push operation, the cursor 28 reaches once the left-hand end of the power gauge 25 and then starts returning in the rightward direction (i.e., toward the position of 0%) as shown in FIG. 4 at a constant velocity. In this case, the cursor 28 moves beyond the position of 0% of the power gauge to the right-hand end thereof unless the player carries out the third push operation. The position of 0% of the power gauge 25 also shows an optimum timing for the shot (hereinafter also referred to as the "best timing point") as shown in FIG. 4. The player preferably carries out the third push operation when the cursor reaches the best timing point. In case where the third push operation is carried out when the cursor just reaches the best timing point, a ball is sent flying straight. In case where the third push operation is carried out after or before the cursor reaches the best timing point, a ball curves left or right to fly accordingly. Three push operations carried out by the player make a single shot in this manner.

Now, description of the half shot will be given below. FIG. 5 illustrates displayed examples of the power gauge 25 when making the half shot. An operation for the power shot is carried out to forcibly make a shot with half of the movement power value for the normal shot. More specifically, when the player wishes to make the half shot, he pushes for example the push button switch PB7 (i.e., a half shot button) of the controller as shown in FIG. 2(a), thus providing shift to the half shot mode. In the half shot mode, the power gauge 25 indicates the movement power value within the range of from 0% to 50% in the gauge as shown in FIG. 5. More specifically, a shot can be made with the movement power value of 100% at the maximum in the normal shot mode, and on the contrary, the half shot mode includes a control for forcibly making a shot with the movement power value of 50% at the maximum. In case where the maximum driving distance for the driver has previously been determined as 250 yards, selection of the driver as a golf club to be used, by the player leads to the maximum driving distance of 125 yard in the half shot mode.

Operation of the controller by the player, a width (i.e. a length) of the power gauge 25 and the movement velocity of the cursor 28 in the half shot mode are similar to those as in the normal shot mode. A certain position on the power gauge indicates a prescribed movement power value in the half shot mode, which has previously been set to be half of the movement power value in the normal shot mode, thus providing a difference between the half shot mode and the normal shot mode. When the player selects his desired club and tries to make a shot with power of about 40%, deviation from the target power of 40% in the half shot mode becomes smaller than that in the normal shot mode.

Figure 6:
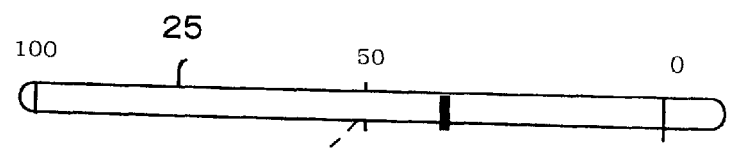
FIG. 6 is a view illustrating comparison of the power gauge for the normal shot with the power gauge for the half shot.
Figure 6:
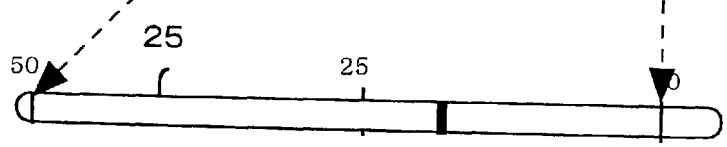

More specifically, the length of the portion of the power gauge 25, which ranges from 0% to 50%, in the normal shot mode is increased in the half shot mode as shown in FIG. 6. As a result, an accuracy in push timing for the second push operation of the push button switch PB8 with respect to a position of the target movement power value in the half shot mode can be improved higher than that as in the normal shot mode. In addition, the movement velocity of the cursor 28 in the half shot mode is identical to that in the normal shot mode so that the push operation of the push button switch PB8 of the controller can be carried out in a sufficient period of time in the half shot mode. More specifically, the movement velocity of the cursor (i.e., the movement distance of the cursor/time) moving on the graph in the half shot mode is identical to the movement velocity in the normal shot mode, with the result that the movement time of the cursor relative to a unit value of power (%) in the half shot mode (for example, the movement time during which the cursor moves from the position of 10% to the position of 30%) becomes longer than that in the normal shot mode, thus making it possible for the player to push the push button switch PB8 of the controller in a sufficient period of time. Accuracy in this aspect can be improved. When the target movement power value is small and the player wishes to make a shot with power for example of about 10%, it is possible to make deviation in the half shot mode smaller than that in the normal shot mode. There may be adopted a structure in which the movement velocity of the cursor (i.e., the movement distance of the cursor/time) in the half shot mode is different from that in the normal shot mode. There is for example contemplated that the movement times are set so that the movement time per unit power value (%) in the half shot mode is identical to that in the normal shot mode.

This also applies to a case in which a shot is made with the maximum movement power value of 50% in the half shot mode. It is therefore easier to stop the cursor just at the target movement power value of 50% in the half shot mode in comparison with a case where there is made an attempt to stop the cursor at the target movement power value of 50% in order to make a shot in the normal shot mode.

Such adoption of the half shot mode permits to improve an accuracy in push timing for the push operation of the push button switch PB8 with respect to the position of the target movement power value. Accordingly, the player can obtain the target driving distance in an accurate manner.

It is also possible to improve an accuracy in push timing for the third push operation of the push button switch PB8 with respect to the best timing point. Accordingly, the player can send the ball flying to the target position on the course in an accurate manner.

Figure 7:
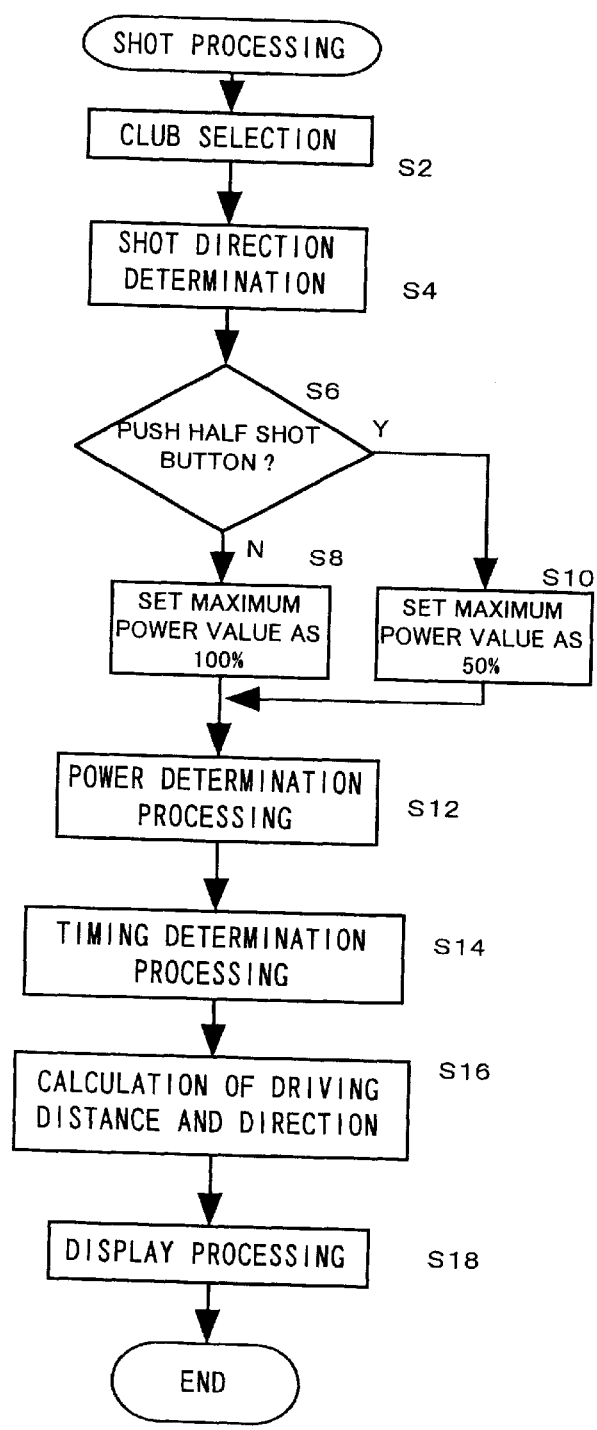
FIG. 7 is a flowchart illustrating a shot process in the golf amusement game system as shown in FIG. 1.
Figure 8:
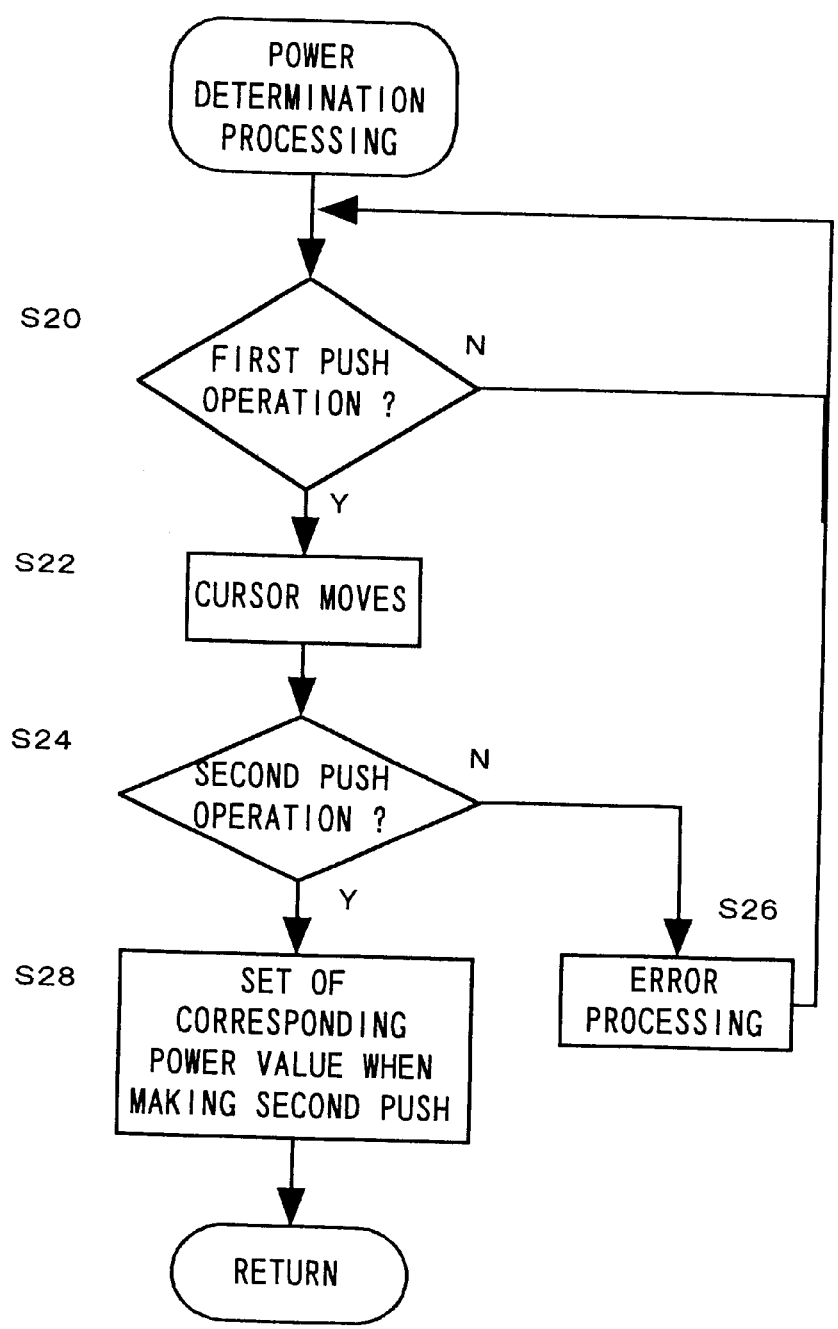
FIG. 8 is a flowchart illustrating a power determination process included in the shot process as shown in FIG. 7.

Now, a shot processing by the player will be described below with reference to flowcharts as shown in FIGS. 7 and 8. FIG. 7 shows a main routine for the shot processing and FIG. 8 shows a sub routine for the power determination processing as shown in FIG. 7. The processing described below is read out from the CD-ROM 15 as shown in FIG. 1 and is executed on the game program loaded into the RAM 3. More specifically, the communication control device 11 detects the instruction and determination, which are mainly carried out by operating the controller 12A by the player. The CPU 1 processes the detected results on the basis of the program and data stored in the RAM 3 to carry out execution.

With reference to FIG. 7, the player first selects a club (Step S2). Operation of the prescribed push button switch of the controller 12A by the player carries out this step. Operation of the controller 12A permits to make a change in club, which is selected currently (i.e., highlighted by hatching) in the selected-club indication portion 22 as shown in FIG. 3. The player operates the controller 12A to select and determine his desired club. The CPU 1 makes reference to data for designating the selected club, which data have previously been loaded into the RAM 3. These date include information such as the maximum driving distance corresponding to the selected club.

Then, the player makes a change in direction of the golfer 20 to determine the direction of a shot, while watching the displayed picture as shown in FIG. 3 (Step S4). Operation of the prescribed push button switch of the controller 12A by the player also carries out this step. The CPU 1 causes the RAM 3 to store temporarily the data for designating the direction thus determined. At this stage, the power gauge 25 has displayed indications of movement power value of "0", "50" and "100" as shown in FIG. 3. The target point indication 24 (248Y) is displayed above the tee ground 21.

Figure 9:
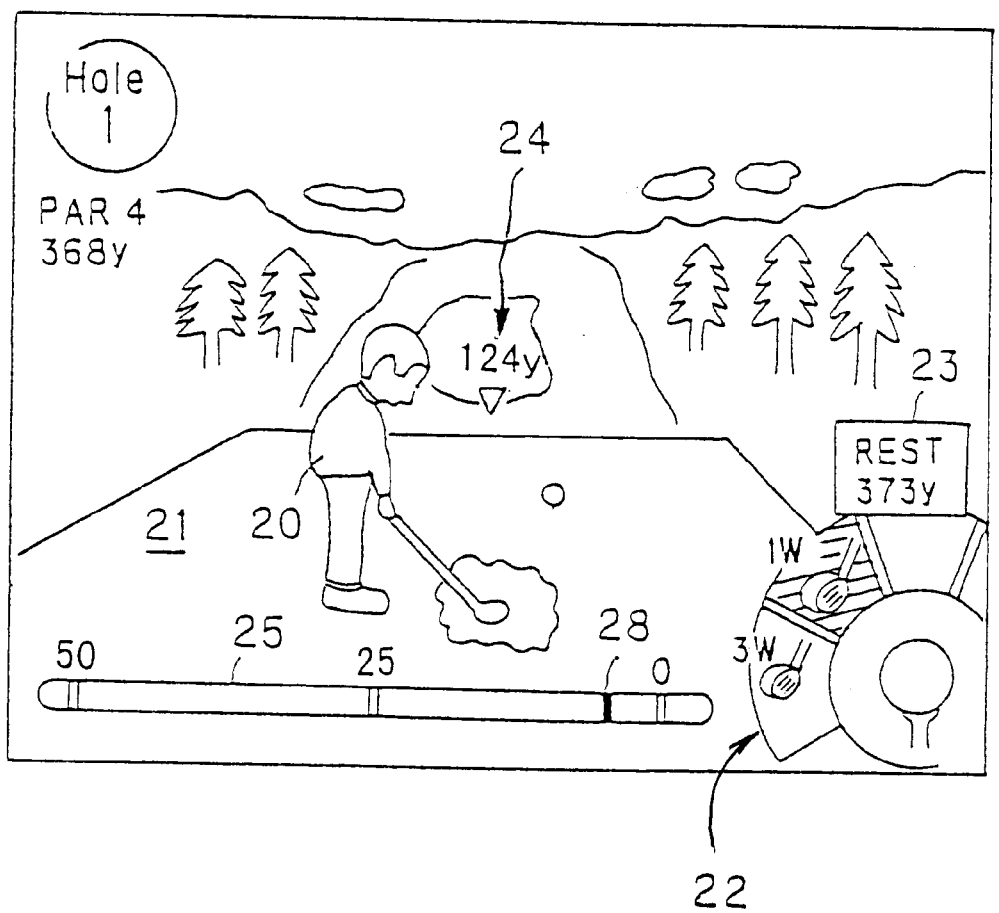
FIG. 9 is a view illustrating an example of a displayed picture when making the half shot in accordance with the golf amusement game system as shown in FIG. 1.

Then, the player determines which of the normal shot mode and the half shot mode is to be used. When the half shot mode is used, the player pushes the push button switch PB7 (i.e., the half shot button) of the controller 12A. The CPU 1, which has judged that the push operation of the push button switch PB7 of the controller 12A was carried out (Step S6), sets the maximum movement power value as the value of 50% (Step S10) and changes the scale having the movement power values on the power gauge 25 to the scale having the movement power values of "0", "25" and "50" as shown in FIG. 9 to display the changed scale. The CPU 1 also changes the target point indication 24 as shown in FIG. 9. More specifically, the target point indication 24 (248Y) for the maximum movement power value of 100% changes to into the target point indication 24 (124Y) for the maximum movement power value of 50% to be displayed. Such change in mode from the normal shot mode into the half shot mode causes the target point indication 24 (124Y), the distance of which can be obtained by making a shot with the maximum movement power value (50%) as shown in FIG. 9, to be clearly displayed. It therefore becomes easier to get visually the target point in comparison with a case where an attempt is made to send a ball flying to half (124Y) of the distance of 238Y of the target point indication 24 as shown in FIG. 3 in the normal shot mode.

In this state, when the player pushes the push button switch PB7 of the controller 12A again, the CPU 1 sets the maximum movement power value as the value of "100%" in correspondence with such a push operation. The push operation of the push button switch PB7 of the controller 12A corresponds to the change operation in maximum movement power value. Whenever the player pushes the push button switch PB7 of the controller 12A, the maximum movement power value changes (alternatively into 100% or 50%). An alternative selection operation of the normal shot mode and the half shot mode is carried out in this manner. Such an alternative selection operation accompanies change in displayed values of movement power value on the power gauge 25 as well as target point indication 24 (see FIGS. 3 and 9).

Then, the CPU 1 carries out a power determination processing (Step S12). The power determination processing is a step for determining the power of shot. Description of the step will be given in detail with reference to FIG. 8. First, the CPU 1 judges as whether or not the first push operation of the push button switch of the controller 12A has been carried out (Step S20). The first push operation corresponds to the start operation for the shot. As a result, when the first push operation has not been carried out as yet, the CPU 1 stands by until the first push operation is carried out. After detection of completion of the first push operation, the CPU 1 controls the GPU 4 and the like as shown in FIG. 5(b) to move the cursor 28 leftward on the power gauge 25 at a constant velocity (Step S22).

The player watches the cursor 28 moving on the power gauge 25, and carries out the second push operation when the cursor 28 reaches nearly the prescribed movement power value. The second push operation corresponds to the power determination operation. The CPU 1 judges as whether or not the second push operation has been carried out (Step S24). No detection of the second push operation is regarded as an operation failure occurred, to carry out a prescribed error processing (Step S26), resulting in return to Step S20 in the processing. After detection of the second push operation, the CPU 1 determines the movement power value on the basis of a lapse of time from a point of time when the first push operation has been carried out to a point of time when the second push operation has been carried out (Step S28). More specifically, the power value that corresponds to the position to which the cursor comes when the push operation is carried out, serves as the movement power value.

When the cursor 28 moves on the power gauge 25 to the left-hand end thereof, i.e., the position of the maximum movement power value of 50%, the CPU 1 controls the GPU 4 and the like to move the cursor 28 rightward on the power gauge 25 at a constant velocity. According to the normal shot mode, when the cursor 28 reaches the position of the maximum movement power value of 100% on the power gauge 25, then it moves rightward in the constant velocity.

Completion of the power determination processing results in return to the main routine as shown in FIG. 7 in the processing and the CPU 1 carries out the timing determination processing (Step S14). The timing determination processing is to detect the third push operation by the player and determine time difference between the detected timing and the timing of the best timing point.

After the determination of the shot direction, the power value and the time difference in timing for the shot, the CPU 1 calculates and determines the driving distance and the direction of a virtual ball (Step S16) and controls the GPU 4 and the like to carry out a processing for displaying a scene in which the ball is flying, on the game screen on the basis of the results obtained (Step S18). The driving distance of the ball is normally calculated on the basis of the maximum distance corresponding to the club currently selected and the movement power value as determined by Step S28. A calculation is made so that the detected timing being behind the best timing point causes the ball to turn left and the detected timing being before it causes the ball to turn right. Such a calculation is known and description thereof in further detail will be omitted. The processing for the single shot is completed in this manner. The player repeats the shot processing described above to advance the amusement game. Even when the golf amusement game advances, leading to a scene for performing a putt, an alternative selection operation of the normal shot mode and the half shot mode is available. In this case, there may be adopted a system in which the maximum power in the normal shot mode moves a ball by a distance of 20 m, while the maximum power in the half shot mode moves the ball by a distance of 10 m.

According to the golf amusement game of the present invention as described above, it is possible to send a ball flying to the target position on the golf course through the half shot mode adopted in a more accurate manner than the normal shot mode.

In the above-described embodiment, an alternative selection operation of two modes, i.e., the normal shot mode and the half shot mode is available and the maximum movement power value can be changed to 100% or 50%. There may however be adopted a structure in which a selection operation of a plurality of modes can be carried out and the maximum movement power value can be changed to 100%, 80%, 60%, 40% and 20%. The value corresponding to one scale unit of the power gauge may be decreased further. The maximum movement power value may be changed to 100%, 200%, 300% and the like.

In the above-mentioned embodiment, the present invention is applied to a shot of the golf amusement game. Application of the present invention is not limited only to it and the present invention can be applied to the other kind of amusement game. A throwing system utilizing the same power gauge is adopted for example in the discus throw, the shot-put or the like in the sports amusement game including athletics. It is also applied to an amusement game of a competition such as archery, quoits or the like in which an object is sent flying to a prescribed target. In addition, the power gauge system of the present invention may be applied for example to casting in an amusement fishing game.

In the above-described embodiment, the power gauge is displayed in the form of combination of the bar graph extending horizontally with the cursor movable leftward or rightward on the bar graph. The power gauge may however be displayed for example in the form of combination of a circle graph with a cursor capable of turning, like the second hand, on the circle graph, or in the other form.

According to the present invention as described in detail, it is possible to move an object to a prescribed target position in a high accuracy, which cannot be obtained by the normal operation, in a type of amusement game, in which the object is moved to the target position for example by a shot in a golf amusement game.

What is claimed is:

1. An amusement game system comprising:

a display device for a picture;

an input device for outputting signals according to operation by a player; and a control device for causing an amusement game to progress and displaying the picture according to a progress of the amusement game on a screen of said display device, said amusement game including a step for moving an object toward a target in a virtual field while making reference to output from said input device, wherein:

said control device comprises:

a first-instruction detection device for detecting a first instruction which has been inputted by the player with a use of said input device;

a cursor-movement device for moving a cursor on a graph having a prescribed length when said first instruction is detected, said graph being displayed on said display device and indicating a movement power value of said object;

a second-instruction detection device for detecting a second instruction which has been inputted by the player with the use of said input device;

a movement power value determination device for determining, when said second instruction is detected, the movement power value of said object on a basis of a lapse of time from the point of time when said first instruction has been detected to a point of time when said second instruction has been detected;

an object movement device for moving said object in the virtual field in accordance with the movement power value thus determined; and a change instruction detection device for detecting a change instruction in a maximum movement power value, which has been input by the player with the use of said input device;

said movement power value determination device determining the movement power value within a range up to a predetermined maximum movement power value, and said movement power value determination device changing said predetermined maximum movement power value and determining the movement power value within the range up to the maximum movement power value thus changed, when said change instruction detection device detects the change instruction in the maximum movement power value, said maximum power value as changed being half of said predetermined maximum movement power value, and a movement velocity of said cursor moving on said graph after detection of the change instruction in said maximum movement power value being substantially equal to a movement velocity of said cursor moving on said graph before detection of the change instruction in said maximum movement power value.

2. The amusement game system as claimed in claim 1, wherein said maximum movement power value as changed is identical to half of said predetermined maximum movement power value.

3. The amusement game system as claimed in claim 1, wherein:
said graph indicates the movement power value within a range of from 0% to 100%, and said predetermined maximum movement power value corresponds to the movement power value of 100%; and
after detection of the change instruction in said maximum movement power value, said graph indicates the movement power value within a range of from 0% to 50%, and said predetermined maximum movement power value as changed corresponds to the movement power value of 50%.

4. The amusement game system as claimed in claim 3, wherein a position of said graph, which indicates the movement power value of 100%, also indicates the movement power value of 50% after detection of the change instruction in said maximum movement power value.

5. The amusement game system as claimed in claim 1, wherein said amusement game is an amusement golf game including a step for moving a ball toward the target in the virtual field.

6. The amusement game system according to claim 1, wherein the cursor-movement device enlarges a scale of the graph when the maximum movement power value is changed to be smaller.

7. An amusement game system comprising:
a display device for a picture;
an input device for outputting signals according to operation by a player; and a control device for causing an amusement game to progress and displaying the picture according to a progress of the amusement game on a screen of said display device, said amusement game including a step for moving an object toward a target in a virtual field while making reference to output from said input device, wherein:
said control device comprises:
a first-instruction detection device for detecting a first instruction which has been inputted by the player with a use of said input device;
a movement power value display device for displaying movement power value of said object within a range up to a predetermined maximum movement power value by means of a graph having a prescribed length and a cursor movable on said graph;
a first cursor-movement device for moving said cursor on said graph in a direction indicating said maximum movement power value in accordance with a lapse of time from a point of time when said first instruction has been detected;
a second-instruction detection device for detecting a second instruction which has been inputted by the player with the use of said input device;
a movement power value determination device for determining the movement power value of said object on a basis of a lapse of time from the point of time when said first instruction has been detected to a point of time when said second instruction has been detected;
a second cursor-movement device for moving said cursor toward a standard position on said graph, after detection of said second instruction;
a third-instruction detection device for detecting a third instruction which has been inputted by the player with the use of said input device;
a movement direction factor determination device for determining a factor associated with a movement direction of said object, in accordance with timing at which said cursor reaches said standard position and with timing at which said third instruction is input;
a movement device for moving said object in the virtual field in accordance with said movement power value as determined and said factor associated with the movement direction of said object;
a change instruction detection device for detecting a change instruction in a maximum movement power value, which has been input by the player with the use of said input device; and
a maximum movement power value change device for changing said predetermined maximum movement power value when the change instruction in the maximum movement power value is detected, said maximum power value as changed being half of said predetermined maximum movement power value, and a movement velocity of said cursor moving on said graph after detection of the change instruction in said maximum movement power value being substantially equal to a movement velocity of said cursor moving on said graph before detection of the change instruction in said maximum movement power value.

8. The amusement game system according to claim 7, wherein the cursor-movement device enlarges a scale of the graph when the maximum movement power value is changed to be smaller.

9. A computer-readable storage medium comprising a program stored therein, said program causing an amusement game to progress and displaying a picture according to a progress of the amusement game on a screen of a display device, said amusement game including a step for moving an object toward a target in a virtual field while making reference to output from an input device of an amusement game apparatus, wherein:
said program causes a computer provided in said amusement game apparatus to function respectively as:
a first-instruction detection device for detecting a first instruction which has been inputted by the player with a use of said input device;
a cursor-movement device for moving a cursor on a graph having a prescribed length when said first instruction is detected, said graph being displayed on said display device and indicating a movement power value of said object;
a second-instruction detection device for detecting a second instruction which has been inputted by the player with the use of said input device;
a movement power value determination device for determining, when said second instruction is detected, the movement power value of said object on a basis of a lapse of time from the point of time when said first instruction has been detected to a point of time when said second instruction has been detected;
an object movement device for moving said object in the virtual field in accordance with the movement power value thus determined; and a change instruction detection device for detecting a change instruction in a maximum movement power value, which has been input by the player with the use of said input device;

said movement power value determination device determining the movement power value within a range up to a predetermined maximum movement power value, and said movement power value determination device changing said predetermined maximum movement power value and determining the movement power value within the range up to the maximum movement power value thus changed, when said change instruction detection device detects the change instruction in the maximum movement power value, said maximum power value as changed being half of said predetermined maximum movement power value, and a movement velocity of said cursor moving on said graph after detection of the change instruction in said maximum movement power value being substantially equal to a movement velocity of said cursor moving on said graph before detection of the change instruction in said maximum movement power value.

10. The computer-readable storage medium according to claim 9, wherein the cursor-movement device enlarges a scale of the graph when the maximum movement power value is changed to be smaller.

11. A computer-readable storage medium comprising a program stored therein, said program causing an amusement game to progress and displaying a picture according to a progress of the amusement game on a screen of a display device, said amusement game including a step for moving an object toward a target in a virtual field while making reference to output from an input device of an amusement game apparatus, wherein:

said program causes a computer provided in said amusement game apparatus to function respectively as:

a first-instruction detection device for detecting a first instruction which has been inputted by the player with a use of said input device;

a movement power value display device for displaying movement power value of said object within a range up to a predetermined maximum movement power value by means of a graph and a cursor movable on said graph;

a first cursor-movement device for moving said cursor on said graph in a direction indicating said maximum movement power value in accordance with a lapse of time from a point of time when said first instruction has been detected;

a second-instruction detection device for detecting a second instruction which has been inputted by the player with the use of said input device;

a movement power determination device for determining the movement power value of said object on a basis of a lapse of time from the point of time when said first instruction has been detected to a point of time when said second instruction has been detected;

a second cursor-movement device for moving said cursor toward a standard position on said graph, after detection of said second instruction;

a third-instruction detection device for detecting a third instruction which has been inputted by the player with the use of said input device;

a movement direction factor determination device for determining a factor associated with a movement direction of said object, in accordance with timing at which said cursor reaches said standard position and with timing at which said third instruction is input;

a movement device for moving said object in said virtual field in accordance with said movement power value as determined and said factor associated with the movement direction of said object;

a change instruction detection device for detecting a change instruction in a maximum movement power value, which has been input by the player with the use of said input device; and a maximum power value change device for changing said predetermined maximum movement power value, when change instruction in the maximum movement power value has detected, said maximum power value as changed being half of said predetermined maximum movement power value, and a movement velocity of said cursor moving on said graph after detection of the change instruction in said maximum movement power value being substantially equal to a movement velocity of said cursor moving on said graph before detection of the change instruction in said maximum movement power value.

12. The computer-readable storage medium according to claim 11, wherein the cursor-movement device enlarges a scale of the graph when the maximum movement power value is changed to be smaller.

* * * * *